No. 754,639. PATENTED MAR. 15, 1904.
J. BROWER.
APPARATUS FOR MAKING BLOCKS FOR BUILDING OR LIKE PURPOSES.
APPLICATION FILED MAR. 16, 1903.
NO MODEL. 4 SHEETS—SHEET 2.

Attest:
C. J. Middleton
Edward Stanton

Inventor:
John Brower
by Ellis Spear Company
Attys.

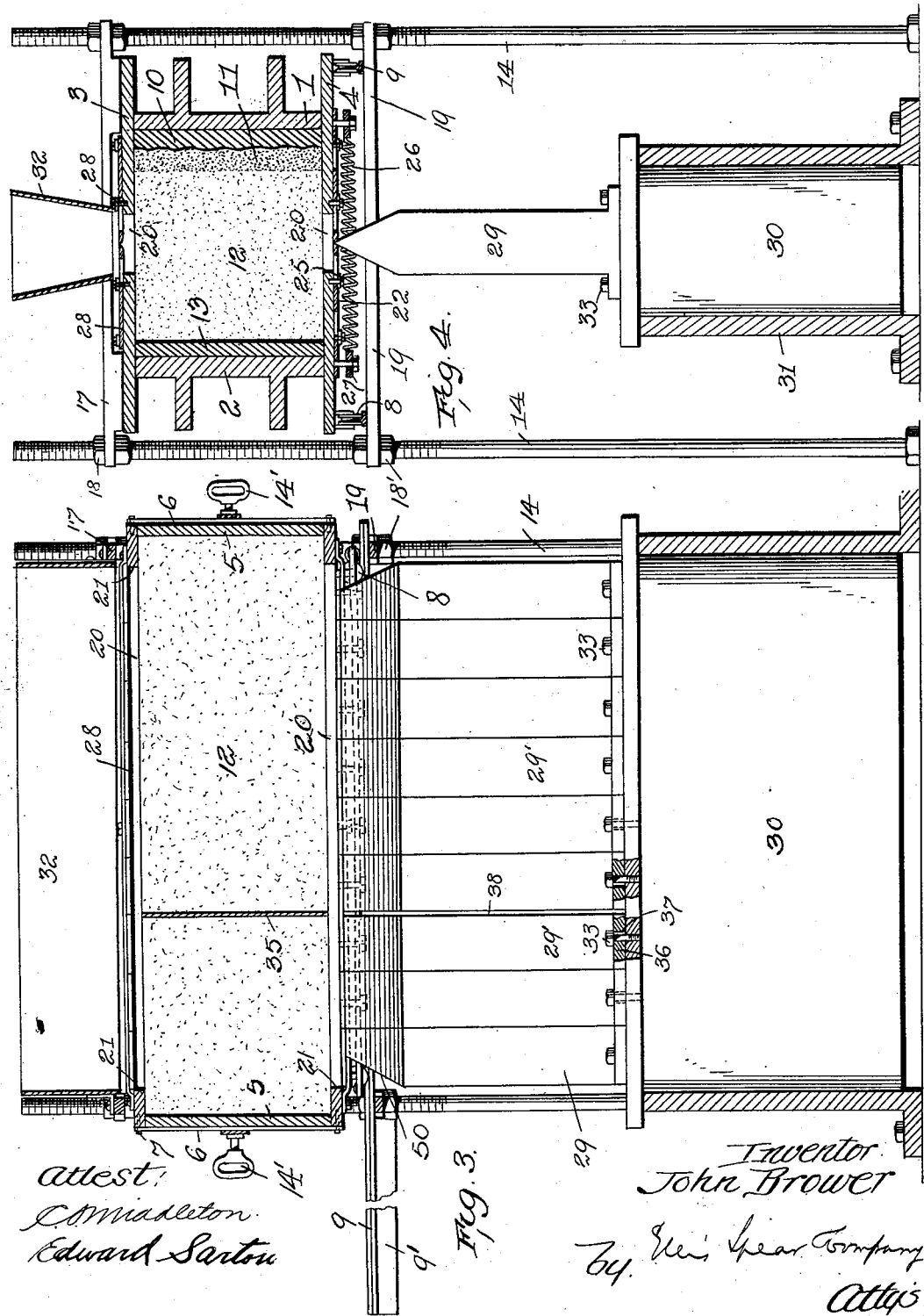

No. 754,639. PATENTED MAR. 15, 1904.
J. BROWER.
APPARATUS FOR MAKING BLOCKS FOR BUILDING OR LIKE PURPOSES.
APPLICATION FILED MAR. 16, 1903.
NO MODEL. 4 SHEETS—SHEET 4.
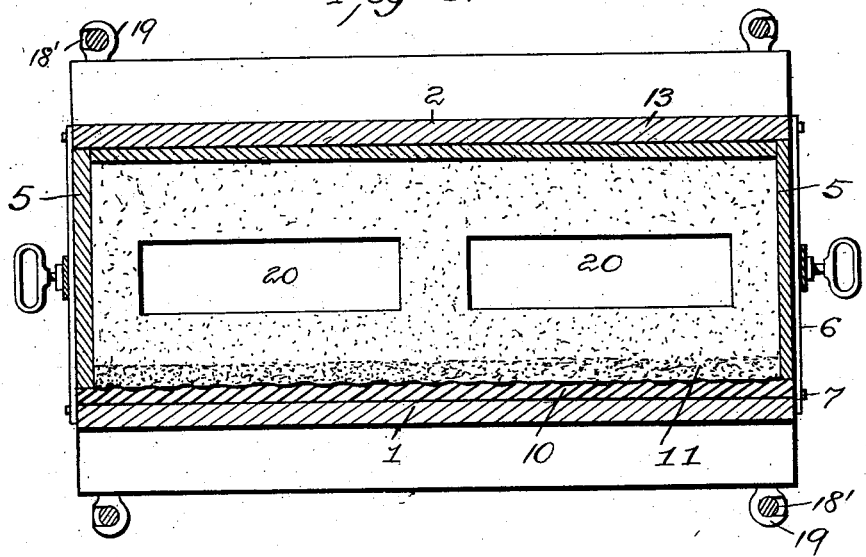
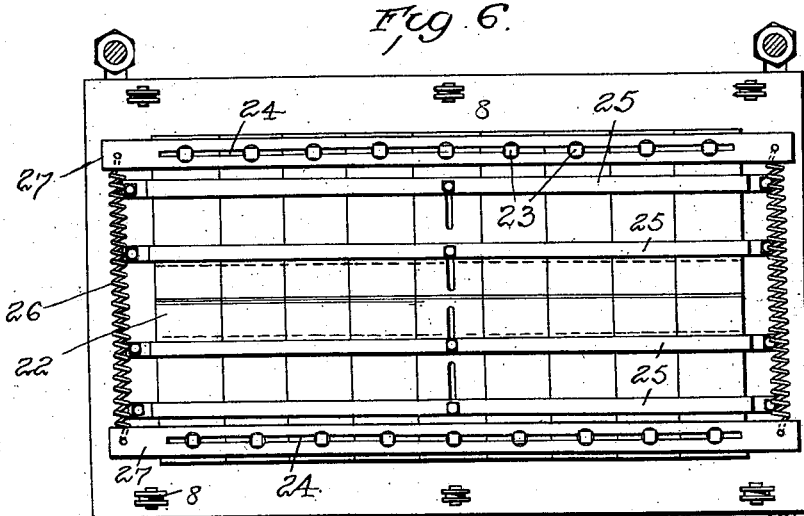

No. 754,639. Patented March 15, 1904.

UNITED STATES PATENT OFFICE.

JOHN BROWER, OF SAN FRANCISCO, CALIFORNIA.

APPARATUS FOR MAKING BLOCKS FOR BUILDING OR LIKE PURPOSES.

SPECIFICATION forming part of Letters Patent No. 754,639, dated March 15, 1904.

Application filed March 16, 1903. Serial No. 148,046. (No model.)

*To all whom it may concern:*

Be it known that I, JOHN BROWER, a citizen of the United States, residing at San Francisco, California, have invented certain new and useful Improvements in Apparatus for Making Blocks for Building or Like Purposes, of which the following is a specification.

It is the object of my invention to provide a machine for making blocks of a hollow form of plastic material suitable for building and like purposes.

In carrying out my invention I take a mass of the plastic material or moist cement and place the same in a mold-box, and I then form the desired openings through this mass of plastic material, at the same time compressing the material within the mold-box, so that the same will be of the proper density and strength when removed from the mold-box and dried. After forming the openings through the plastic material and compressing said material within the mold-box I introduce into the said openings a filler or fillers, preferably formed of sand. The sides of the mold-box are then stripped from the plastic material now in the form of a hollow block, with a sand filler or fillers therein, and the block is allowed to dry. In introducing the plastic material into the mold-box I place at the bottom of the box a mold or die plate having its upper face of any suitable ornamental form or design, and upon this is placed a layer of rich plastic material, and upon this again is placed a body of poorer material.

The above process of forming the openings and compressing the material is then performed, and when the parts of the mold-box are stripped from the formed plastic material the layer of rich plastic material is uppermost, and by removing the die therefrom the ornamental face is left exposed for drying.

The invention consists in the features and combination and arrangement of parts hereinafter described, and particularly pointed out in the claims.

Figure 1:
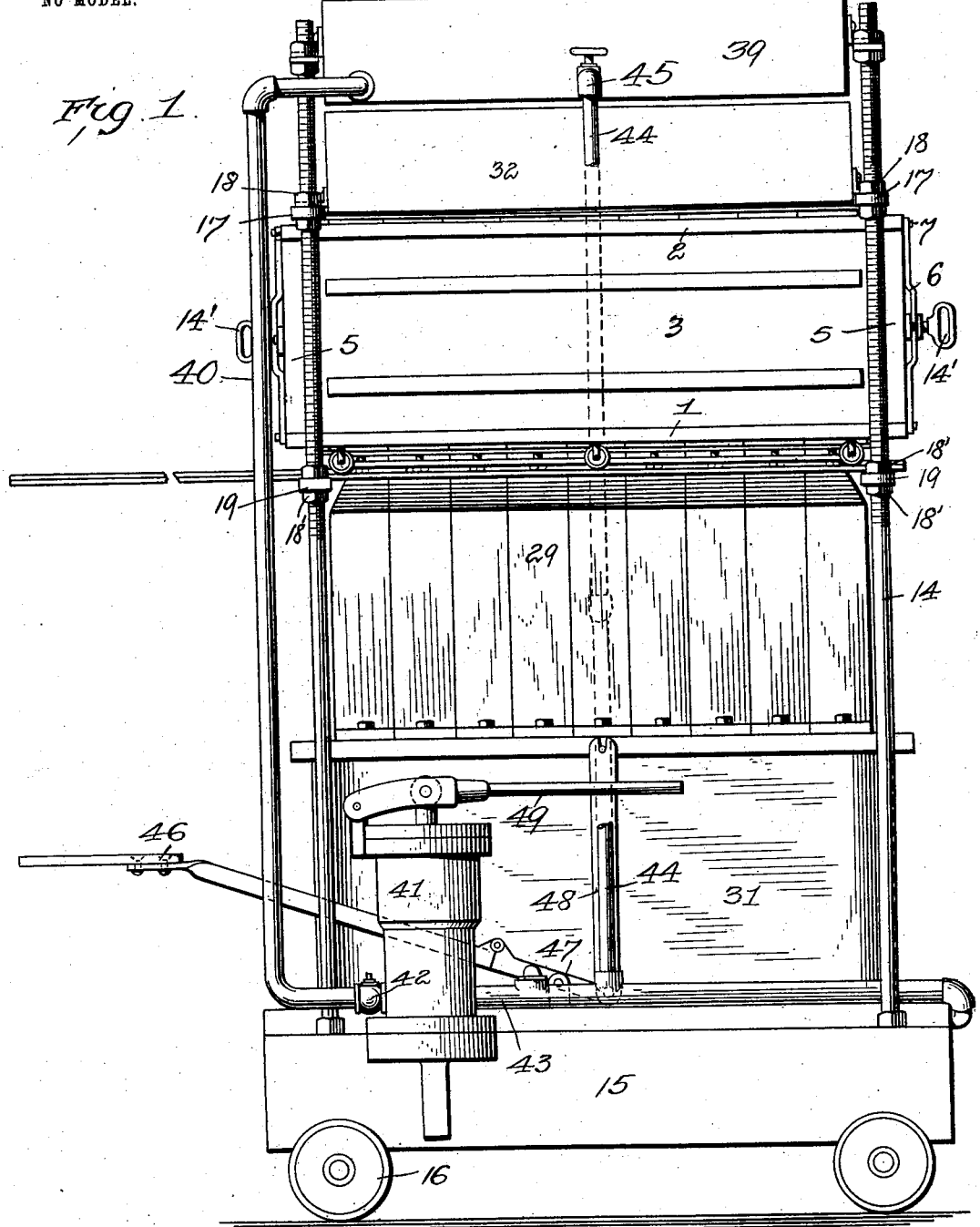
Figure 2:
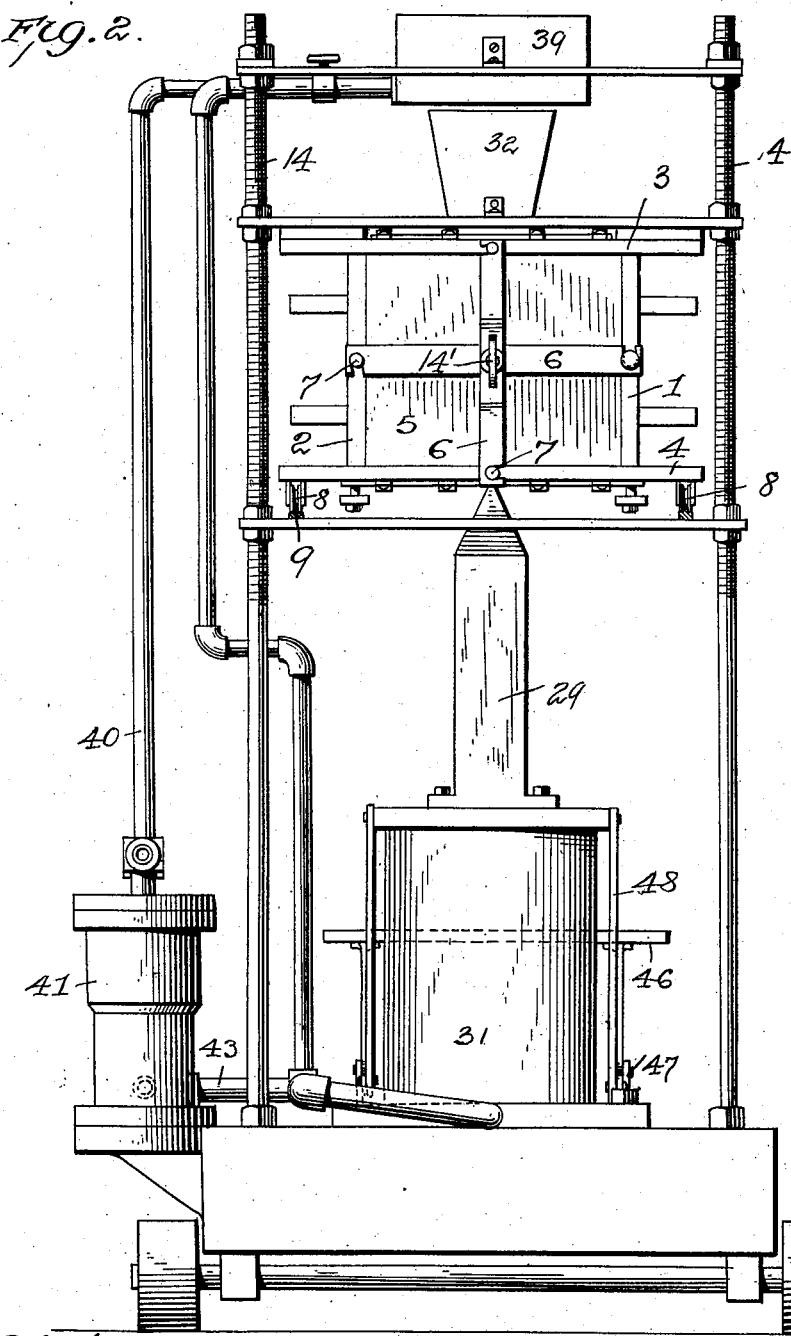

In the accompanying drawings, Figure 1 is a front view of a machine, showing one embodiment of my invention. Fig. 2 is an end elevation of Fig. 1. Fig. 3 is a sectional view taken longitudinally through the mold-box and part of the ram, some of the parts being shown in side elevation. Fig. 4 is a transverse sectional view through the mold-box and part of the ram with some of the parts shown in elevation. Fig. 5 is a plan view of the mold-box with the plastic material therein. Fig. 6 is a bottom plan view of the mold-box.

Referring first to the mold-box, it will be seen that this box is composed of a bottom plate 1, a top plate 2, and side plates 3 and 4. These are removably connected to each other by any suitable fastening means, and I have shown in Fig. 2 one way in which these parts composing the mold-box may be secured together. For this purpose the end plates 5 of the mold-box are adapted to fit within the sides and bottom and top, so that the end portions of these parts will bear upon the edges of the end plates, and for securing them in this position latches 6 are suitably pivoted to the outer sides of the end plates and engage pins 7, projecting from the end edges of the top and bottom plates and the side plates. The mold-box is provided with rollers 8, journaled in bearings secured to the plate 4 and adapted to run upon tracks or rails 9, supported by the frame of the machine, and these tracks are extended, as shown in Fig. 3, to one side of the frame of the machine, where they may be supported by any suitable table or an extension of the frame, such as indicated at 9'.

The mold-box is filled with the plastic material while it is supported at one side of the machine upon the table or extension 9' and while it is in position with its top 2 uppermost.

Before the plastic material is placed in the mold I place upon the bottom 1 a die or mold plate 10, having its upper face of the ornamental configuration or of the design which it is intended to give to the face of the block when completd. Upon this die-plate a layer of rich plastic material is placed, this layer being comparatively thin, and upon this again is placed the mass of poorer material, which entirely fills the mold-box above the layer of rich material. The layer of rich material is indicated at 11, and the mass of poorer material at 12. Upon the upper surface of the mass 12 a board 13 is placed, and upon this again is placed the cover or top 2, which is then secured in proper position by means of one of the latches 6, carried by the end plate of the mold. After having been filled the mold-box is given a quarter-turn and is placed upon the rails 9, and in thus turning the mold any suitable form of crane or power-lifting machine may be employed, and to afford a suitable hold for such machine the end plates of the mold-box may have suitable lugs or extensions 14'. After having been placed on the rails the mold-box is run into position within the frame of the machine between standards or straining-rods 14, extending up from a platform 15, which is carried by suitable wheels 16. These straining-rods are connected at or near their upper ends by cross-braces 17. These are adjustably connected with the straining-rods by nuts 18, and there is one of these cross-rods extending transversely over the mold-box at or near each end thereof, as shown in Fig. 3. The straining-rods are also connected at a point intermediate of their height by cross-rods 19, these being also adjustably connected with the straining-rods by nuts 18' and serving to support the tracks upon which the mold-box is moved into and out of operative position within the frame.

The sides 3 and 4 of the mold-box, as shown in Fig. 4, and which now temporarily form the top and bottom of the same, are provided with openings 20, arranged centrally thereof and extending longitudinally, but not through to the ends, the said openings ending at the points 21, as indicated in Fig. 3. These openings are normally closed by slides, those marked 22 for the side 4 being arranged to slide on the outer or lower side of the said side plate 4, where they are guided by means of bolts 23, passing through slots 24 in the bars 27, and by straps or bars 25, secured to the side plate 4, which straps also serve to hold the slides or gates in place. These slides are normally held inwardly by spring-pressure, and as a representative way of exerting the spring-pressure upon the slides I have shown a spiral spring 26, connected with bars 27, to which the slides are connected.

By reference to Fig. 6 it will be seen that there are two series of slides which are located on each side of the central opening in the side plate 4. The slides of each series fit closely against each other and practically form a continuous closure for the opening in the side plate 4.

The slides 28, which close the upper opening 20 of the mold-box, are similarly arranged and are equal in number to the lower slides, and normally they form an unbroken closure for the opening 20. They are adapted to open automatically, as will be hereinafter described, but are not furnished with spring means for closing them automatically. They are supported and guided in a manner substantially similar to that described in connection with the lower slides 22.

When the mold-box is in position within the frame, it fits closely under the cross-bars 17, which are adapted to resist upward movement of the mold-box when the same is subjected to the compressing action about to be described.

In order to compress the material within the mold-box and at the same time form openings through the material to provide the blocks of hollow form, I employ wedge means to be thrust into and through the mold-box where the openings are to be formed in the block, so that the material will be compressed laterally and outwardly against the sides of the box and whereby also openings will be left in the block when the wedge means is withdrawn.

The wedge means consists, as shown in Figs. 3 and 4, of a wedge or former 29, secured to a piston 30 of a suitable power-applying means, such as a hydraulic ram. The wedge or former is made up of a number of sections 29', these being equal in number to the number of closing slides in any one series of said slides, or, in other words, there are as many wedge members extending from end to end of the machine as there are closing slides or gates extending from end to end of the machine, and the wedge members and closing slides correspond in position, the joints or lines of division between the wedge members coinciding with the lateral joints or lines of division between the slides.

By reference to Fig. 4 it will be seen that the points of the wedge members are directed to the center line of the mold, where opposing closing slides meet, and when the wedge moves upwardly it will enter between these slides, they having their ends beveled for the entrance of the wedge, and the wedge will pass into the mold-box and in its upward passage will compress the material laterally against the sides of the mold-box, and as it continues its upward movement it will pass upward through the opening 20, the slides 28 moving back when the wedge contacts therewith.

The wedge action will force the material against the die or former 10 to receive the impression from the design on the face thereof. As the wedge lowers I introduce moist sand through a hopper 32, which directs it into the openings left by the wedge, so that the molded plastic material will have a sand filler located in its opening to sustain the material while the same is setting into shape or drying.

As the wedge is leaving the mold-box the lower slides or gates 22 will close, their inner edges bearing constantly upon the sides of the wedge under pressure of the spring 26, so that the said inner edges will come together at the moment that the point of the wedge is withdrawn, and thus the operation of placing the sand filler within the plastic material will follow the withdrawal of the wedge and will take the place of said wedge to prevent the collapse of the mass of the plastic material just compressed.

I do not wish to limit myself to any particular means for introducing the sand filler, as any means will answer the purpose so long as the sand filler is introduced soon enough to prevent the collapse or displacement of the compressed plastic material.

As before stated, the upper slides 28 are not spring-pressed, and they remain open during the recession of the wedge and while the sand core is being introduced.

I form the wedge in sections, and I also form the closing means 22 and 28 in sections, so that blocks of different forms may be made—that is, in respect to the openings or holes therein—for it will be noticed that by simply removing the desired number of wedge-sections different sizes of openings may be formed, and, if desired, a plurality of openings may be formed through the block with webs of the cement or plastic material left between them. The wedge-sections are secured to the ram 30 by bolts 33, allowing the sections to be removed, and the slides are removably connected with the bars 27 in any suitable manner which will permit of their removal, such as by bolts 23. The upper slides may also be removed by taking out their guiding and holding bolts, as will be seen from Fig. 3. I may place in the mold-box a partition 35, located at any suitable point therein and extending transversely thereof, so that two blocks may be formed instead of one, if desired, and in order to permit this the wedge members must have a slight adjustment, so as to avoid this partition. Such adjustment, as shown in Fig. 3, is allowed by forming the flanges 36 of the wedge members with enlarged openings 37 for the passage of the bolts 33. By simply loosening the bolts and shifting the wedge members a space 38 will be left between the two series of wedge members at the point where the partition 35 is located.

After the material has been compressed and the sand filler or fillers have been placed in the openings left by the withdrawal of the wedges the mold-box is run out from the frame on the tracks 8 to a position over the extension or table 9'. The mold-box is now given a quarter-turn by means of the crane before mentioned or manually, if desired, and its bottom 1 is now set uppermost, the fastenings are loosened, the sides 3 and 4 are removed, and then the bottom plate 1 is lifted off, after which the die or mold plate 10 is lifted from the layer of rich material. After this has been done the molded block with its sand filler is lifted from the top plate 2, together with the board 13, and it is then set away to dry. While resting upon this board during this drying or setting action the sand filler will sustain the material in proper shape and prevent any displacement or collapse of any portion thereof. After drying for the proper length of time the block is removed from the board 13, and it will then be ready for use after the removal of the sand filler, and it will be found that all of the sides are smooth and adapted for building or like purposes. The parts of the mold-box may now be put together and the above operation repeated for the formation of another block.

Any suitable power may be used for thrusting the wedge into the mold-box; but I have shown means whereby hydraulic power may be utilized. For this purpose a tank 39 is supported at the upper ends of the straining-rod and is connected by the pipe 40 with a hydraulic pump 41, having a check-valve at 42 for the inlet of water to the pump-cylinder and having a pipe connection 43 from the said pump-cylinder to the cylinder 31 of the hydraulic ram. A branch connection 44 extends from the pipe 43 back to the tank 39, and a valve 45 is located in this connection.

A foot-lever 46 is pivoted at 47 to the frame and is connected by links 48 to the piston of the hydraulic ram, and by pressing down on this foot-lever the ram and wedge may be given its initial movement to raise it to the point at which the power is to be applied, and during this raising action the valve 45 is open, so that the water from the tank 39 is free to fill the space within the hydraulic cylinder, the purpose of this arrangement being to get a quick initial movement of the ram and wedge and set them quickly in position to receive the power from the hydraulic pump. After this position has been attained the valve 45 is closed and the hand-lever 49 of the hydraulic pump is operated, so that the water will then be forced from the tank 39 through the pipe 40 and pipe 43 into the hydraulic cylinder 31, causing the rise of the hydraulic piston 30 and the operation of the wedge under the necessary power.

It will be understood that the machine above described is simply representative of the principle of my invention, and I do not wish to limit myself to this particular embodiment of the said invention, as details may be altered without departing from the fundamental principles. From Figs. 1 and 3 it will be noticed that the ends of the wedge at 50 are beveled, so that the same wedging action is obtained at the ends of the mold-box as takes place in relation to the sides thereof.

By reference to Figs. 3 and 4 it will be seen that the opening 20 in one side of the box extends continuously from near one end thereof to near the other end and that the sections 29 of the wedge or compressing means may pass through this opening in any desired groups, so that a plurality of openings may be formed in the material within the box, and it will be noticed also from Fig. 6 that the gates or slides correspond in position and number to the sections of the compressing means and normally close the continuous opening.

I claim as my invention—

1. In combination, a mold-box made up of separable members, a removable die within the box on one side, openings in the two adjacent sides of the box, means for forming an opening in the material and compressing the said material within the box and against the die and means for the insertion of a sand filler into the opening in the material.

2. In combination with a mold-box having openings in its opposite sides a wedge reciprocating through both openings and through the box means to close one of the openings said means being operated by the wedge to free the opening on one stroke the wedge then returning through the opening formed in the material substantially as described.

3. In combination a mold-box having an opening, a wedge to enter the mold-box, automatic means for closing the mold-box as the wedge is withdrawn therefrom and means for the insertion of a sand filler into the opening left by the withdrawal of the wedge, substantially as described.

4. In combination a mold-box having opposite openings, a wedge to enter the mold-box through one opening and to recede through the said opening, the other opening permitting the introduction of sand core, means for introducing the said core and means for closing the openings, substantially as described.

5. In combination a mold-box having a plurality of gates located side by side to form a closure for an opening in the mold-box and means formed in sections to enter the said opening for compressing the material in the mold-box and leave openings in the said material, said sections corresponding in number to the number of gates whereby differently-disposed openings may be left in the molded article, substantially as described.

6. In combination a mold-box having an opening, a wedge formed in sections each of which is adjustable and a partition to be placed in the mold-box, and sectional means to close the opening in the box independent of the wedge, substantially as described.

7. In combination a frame, a mold-box supported on rollers, and formed in separable sections and having openings in opposite sections, tracks on the frame for the said rollers and wedge means within the frame adapted to enter the mold-box for compressing the material therein, substantially as described.

8. In combination, a mold-box comprising a bottom, two sides and a top separable from each other, rollers on one of the sides, openings through the sides in line with each other, a die resting on the bottom and means for turning the box so that the bottom may be in its lowermost position or may be in an upright position, substantially as described.

9. In combination, a mold-box comprising a bottom, two sides and a top separable from each other, rollers on one of the sides, openings through the sides in line with each other, a die resting on the bottom and means for turning the box so that the bottom may be in its lowermost position or may be in an upright position and a board 13 at the top of the box, substantially as described.

10. In combination a mold-box having an opening extending continuously from near one end to near the other end of one side of the box, means formed in sections for entering the said continuous opening to provide a plurality of openings in the material within the box and gates or slides corresponding in position and number to the sections, said gates or slides normally closing said continuous openings from end to end, substantially as described.

11. In combination a mold-box having an opening, a wedge formed of removable sections, to enter the said mold-box and a series of movable gates corresponding in number to the sections of the wedge, the wedge-sections being arranged side by side and in contact to form a complete wedge, substantially as described.

In testimony whereof I affix my signature in presence of two witnesses.

JOHN BROWER.

Witnesses:
HENRY E. COOPER,
WALTER DONALDSON.